June 29, 1954 C. E. HUNT, JR 2,682,573

MEANS FOR DETECTING ERRORS IN APPARATUS FOR ANALYZING CODED SIGNALS

Filed March 21, 1952 3 Sheets-Sheet 1

CLAYTON E. HUNT JR.
INVENTOR.

BY Daniel J. Mayne
Lee H. Kaiser

ATTORNEYS

June 29, 1954 C. E. HUNT, JR 2,682,573

MEANS FOR DETECTING ERRORS IN APPARATUS FOR ANALYZING CODED SIGNALS

Filed March 21, 1952 3 Sheets-Sheet 2

CLAYTON E. HUNT JR.
INVENTOR.

BY Daniel I. Mayne
Lee H. Kaiser

ATTORNEYS

June 29, 1954 C. E. HUNT, JR 2,682,573

MEANS FOR DETECTING ERRORS IN APPARATUS FOR ANALYZING CODED SIGNALS

Filed March 21, 1952 3 Sheets-Sheet 3

CLAYTON E. HUNT JR.
INVENTOR.

BY Daniel I. Mayne
Lee H. Kaiser

ATTORNEYS

Patented June 29, 1954 2,682,573

UNITED STATES PATENT OFFICE 2,682,573

MEANS FOR DETECTING ERRORS IN APPARATUS FOR ANALYZING CODED SIGNALS

Clayton E. Hunt, Jr., Rochester, N. Y., assignor to Eastman Kodak Company, Rochester, N. Y., a corporation of New Jersey Application March 21, 1952, Serial No. 277,801

4 Claims. (Cl. 178—23)

The present invention relates to apparatus for analyzing coded signals and recording in legible form the characters represented by such signals, and more particularly to circuit arrangements for indicating or recording the fact that the correct character has not been recorded or printed.

The preferred embodiment of the invention to be described in detail is an apparatus for recording on paper numerical characters represented by coded signals derived from perforated tape or business record cards. In such apparatus a multiple digit code has been employed to provide the different printing signals and as heretofore constructed if one digit of a coded signal was missing for any reason, such as dirt in a perforation, a character different from the one desired would be printed. Such an error in a legible message would in most instances be detectable by the reader whereas the printing of a wrong numeral could seriously alter the value of a number without giving any evidence that an error has been committed.

The primary object of the invention is to provide apparatus which will not print an incorrect character when for any reason one digit of a coded signal is missing.

Another object of the invention is to provide analyzer apparatus adapted to utilize signals received in known code combinations which apparatus will detect and indicate the receipt of signals in non-code combinations.

Another object of the invention is to provide a circuit arrangement which will provide an error signal when one digit of a coded signal is missing.

The invention itself, as well as other objects and advantages, will be understood from the following description of the accompanying drawings in which.

Figures 1, 2:
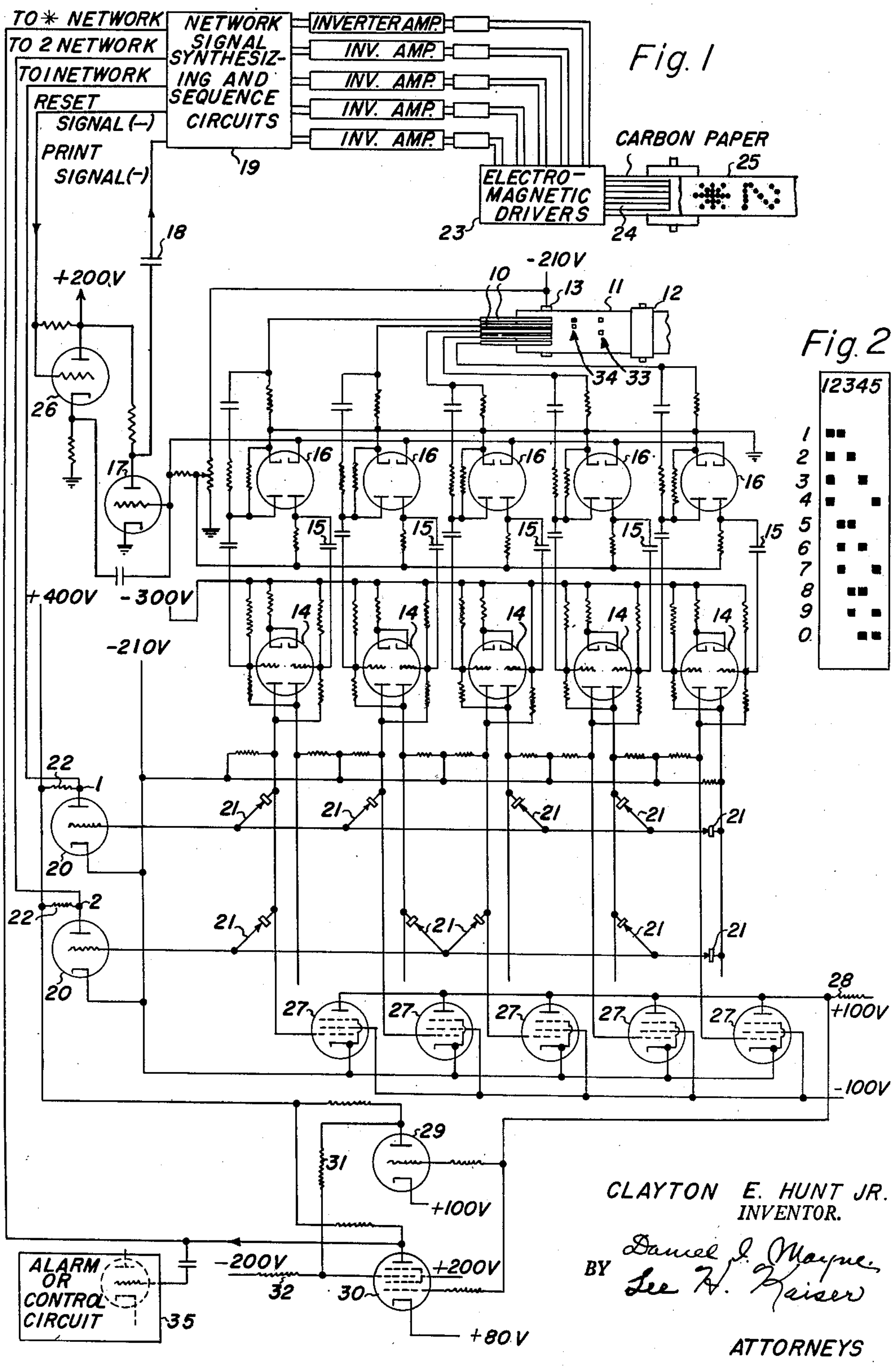
Fig. 1 shows schematically a signal analyzing and error detecting unit incorporated in an apparatus for recording from a punched card or tape.
Fig. 2 shows a five element binary code for numerals which the apparatus of Fig. 1 is designed to handle.

The apparatus illustrated for the purpose of describing the invention is of the same type as that disclosed in my Patent No. 2,575,017 and includes a group of five brushes 10 for sensing the perforations in a perforated tape 11 which may be moved by suitable means 12 between the sensing brushes 10 and an electrode 13 connected to a source of high negative voltage. These five sensing brushes 10 are connected to the left-hand side of individual twin triode tubes 14 connected in ordinary flip-flop arrangement. Initially, all five of the flip-flop tubes 14 have their left sides conducting. When one or more of the sensing brushes 10 encounters a perforation it connects the electrode 13 to the grid of the left-hand side of its associated flip-flop tube 14 which functions to transfer current from the left to the right side of the tube 14, thereby producing a positive pulse from its left anode through a capacitor 15 and the right side of its associated diode 16 to the grid of a tube 17 which thus starts to conduct. When the tube 17 starts to conduct it generates a negative pulse on its anode which pulse is applied through a capacitor 18 to the first trigger tube of the sequence circuit associated with the signal synthesizing network 19 which may be identical with that shown in Fig. 1 of my Patent 2,575,017.

A series of character-selecting tubes 20, one for each character to be printed, have their grids connected through a resistance 21, which in the preferred embodiment is a diode or other type of rectifier, to one side or the other of all five flip-flop tubes 14 in such a manner that a signal must be received simultaneously from all five flip-flop tubes 14 in order to render the character-selecting tube 20 conducting and thus provide a negative potential on the anode terminal of the tube 20 due to its load resistor 22. Only two character-selecting tubes 20 are shown in the drawing and the anode terminals of these tubes are designated by the character the respective tubes are connected to represent, i. e., the numerals 1 and 2.

As thus far described, the circuit is essentially that of Fig. 2 of my above-mentioned patent, there being, however, only five flip-flop tubes since only a five digit code is to be employed, and when the brushes 10 sense perforations in the first two positions of the code shown in Fig. 2 corresponding to the numeral 1 the first two flip-flop tubes 14 (counting from the left) have their currents transferred to the right side which leaves the grid of the tube 20 having the anode terminal 1 connected only to flip-flop circuits which are not conducting. Thus the grid of this tube 20 has the potential of its cathode and is conducting, while the grids of all the other tubes 20 are connected to at least one flip-flop element which is conducting and are, therefore, subjected to the more negative potential of the cathodes of the tubes 14 which biases them beyond cutoff. As fully described in my abovementioned patent, when the tube 20 conducts to post a negative potential on its anode terminal 1 the "1" network conditions the signal synthesizing circuits so that as the sequence circuit, in response to the print signal from the tube 17, operates through its cycle the electromagnetic drivers 23 are furnished successive groups of signals which actuate styli 24 to mark a paper tape 25 in the pattern of the numeral 1. The paper tape 25 is here shown as being marked by carbon paper recording and it will be appreciated that the tape 25 will be advanced under the styli at a speed such that it moves a distance equal to the desired height of a character during the period required for the sequence circuit to complete one cycle.

When the sequence circuit completes a cycle it furnishes a negative pulse to the grid of a normally conducting triode 26 connected as a cathode follower which cuts it off and the resulting negative pulse appearing on its cathode is applied through the right side of all the duodiodes 16 to the grids of the right sides of the tubes 14, thereby resetting all the flip-flop tubes 14 to their initial state in which their left sides are conducting.

As shown in Fig. 2 the code for each numeral consists of two signals out of five possible. When this code is employed the following arrangement is a convenient one for sensing errors in accordance with the invention. Five pentode tubes 27 individual to the five flip-flop circuits provided by the tubes 14 have their control grids connected to the anodes of the normally conducting sides of the flip-flop circuits so that each pentode will be cut off unless and until its associated flip-flop circuit receives a signal transferring the current away from the normally conducting side. The fact that a pentode when conducting can be made to draw a relatively constant current regardless of its plate voltage is here utilized to provide across a common load resistor 28 a voltage drop which is proportional to the number of pentode tubes 27 which are conducting. As here shown it is assumed that the voltage drop across the load resistor 28 is twenty volts for each conducting pentode tube 27.

The anode voltage of the pentode tubes 27 is applied to the grid of a triode inverter tube 29 and to one of the two independent control grids of a dual control tube 30, such as type 6L7, the other control grid of which is connected through resistors 31 and 32 to the anode of the inverter tube 29 and a 200 volt negative bias, respectively. With this arrangement the inverter tube 29 is conducting only when none of the pentode tubes 27 is conducting, i. e., there is no voltage drop across the load resistor 28, and while the inverter tube 29 is conducting the negative bias prevails to drive below cut off one of the control grids of the dual control tube 30. When only one of the pentode tubes 27 is conducting the resultant voltage drop across the load resistor 28 reduces the grid potential of the inverter tube 29 to cutoff but, since the cathode of the dual control tube 30 is at only +80 volts, this voltage drop is not sufficient to cut off the dual control tube 30. However, when two pentode tubes 27 conduct the drop across the load resistor 28 reduces, by assumption, to 60 volts the potential applied to one of the grids of the dual control tube 30 and it is cut off. It is thus seen that the dual control tube 30 conducts only when only one of the pentode tubes 27 is conducting, and under the operating conditions described above the output of the tube 30 can be employed to indicate an error or introduce any desired control.

The operation of the apparatus will be readily understood by following the action produced by the two sets of perforations 33 and 34, representing, respectively, the numerals "2" and "1," carried by the tape 11 and which has passed under the sensing brushes 10. The perforations 33 in passing under the brushes 10 furnished signals which transferred the current from the left to the right side of the first and third flip-flop tubes 14. Under these conditions the tube 20 having the anode terminal 2 is the only one having its grid connected only to non-conducting flip-flop circuits and a signal is furnished the "2" network to print the numeral 2 on the recording tape 25.

The perforations 34 in passing under the brushes 10 should have brought about the printing of the numeral 1, however, as indicated by light shading, one perforation contained dirt or other foreign matter which prevented a signal from going to the first flip-flop tube 14. Thus only the second flip-flop circuit suffered a current transfer leaving the grid of the tube 20 having the anode terminal 1 connected to the conducting left side of the first flip-flop circuit and no signal was furnished to the "1" network. However, since a current transfer took place in only the second flip-flop circuit, the second pentode tube 27 alone became conducting which caused the dual control tube 30 to conduct for the reason that the 20 volt drop across the load resistor 28 was sufficient to cut off the inverter tube 29 and thus remove the cutoff potential on one of the grids of the dual control tube 30 but was not sufficient to drive to cutoff its other control grid for the reason that its cathode is twenty volts less positive than the potential of the cathode of the inverter tube 29.

When the dual control tube 30 started to conduct it produced on its anode a pulse indicative of faulty operation which pulse may be employed as an error signal for any desired purpose and is here shown as operating an alarm or control circuit 35 and also as furnishing a signal to the recorder for printing an error indication such as an asterisk.

Figure 3:
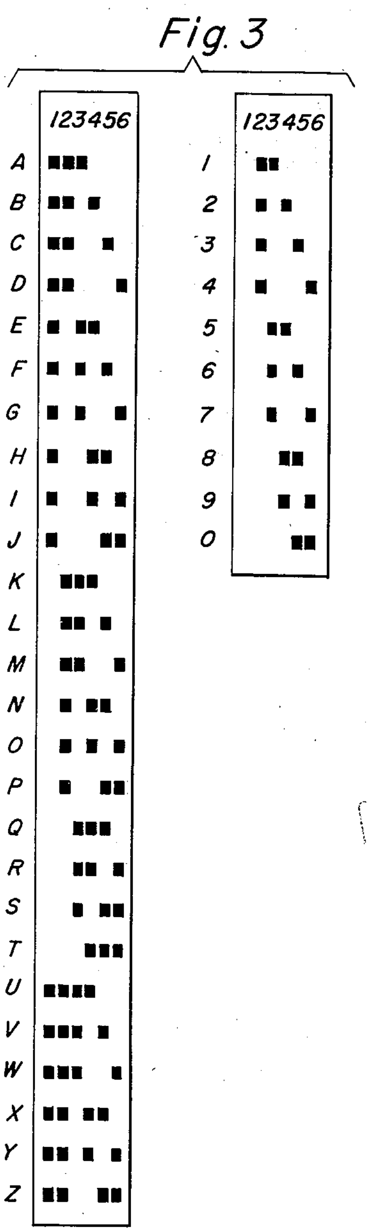
Fig. 3 shows a complete alphabetical code using six positions and incorporating the five position numerical code of Fig. 2.

Since it is more important to know of an error in the printing of numbers than in the printing of words, the above arrangement can be applied to the numerals in a complete alphabetical code such as is shown in Fig. 3. It will be noted that this is a six position code in which the numerals occupy positions 2 through 6 and no letter has less than two signals in these positions. This code requires six sensing brushes and six flip-flop circuits as in my Patent 2,575,017 but the five pentode tubes 27 will be connected to only the last five flip-flop circuits to function as above described to furnish an error signal for improperly sensed numerals but not necessarily for wrong letters.

When considered desirable the same system can be extended to provide an error signal for both letters and numerals by employing a seven position code in which all the characters are represented by either two or four signals. Such an extension merely requires the addition of another set of inverter and dual control tubes 29 and 30 biased to provide a signal only when only three pentode tubes 27 are conducting. Thus, when one signal is missing from any character code, one or the other of the dual control tubes 30 will initiate an error signal since the code consists entirely of two or four signals. One such code is illustrated in Fig. 4.

Figure 4:
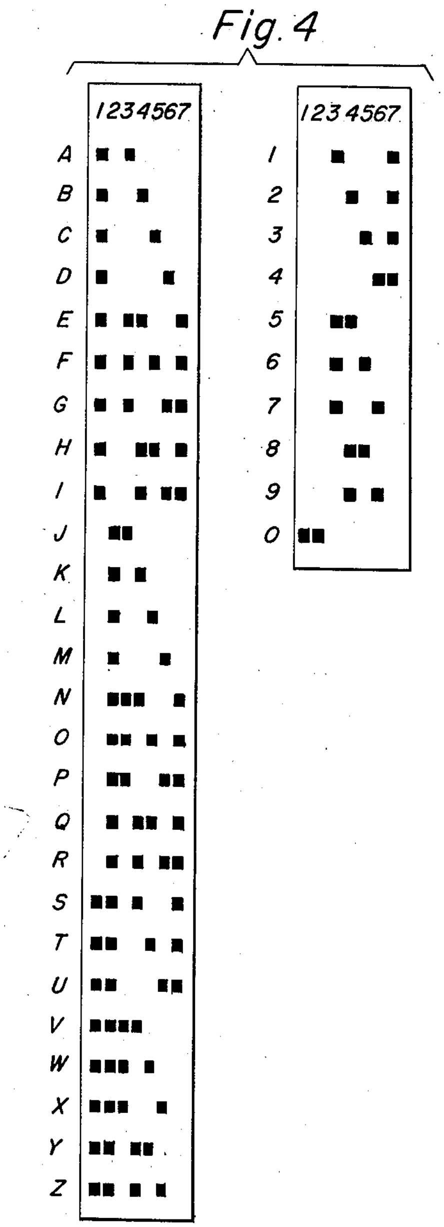
Fig. 4 shows a seven position code in which each character is represented by either two or four signals.
Figure 5:
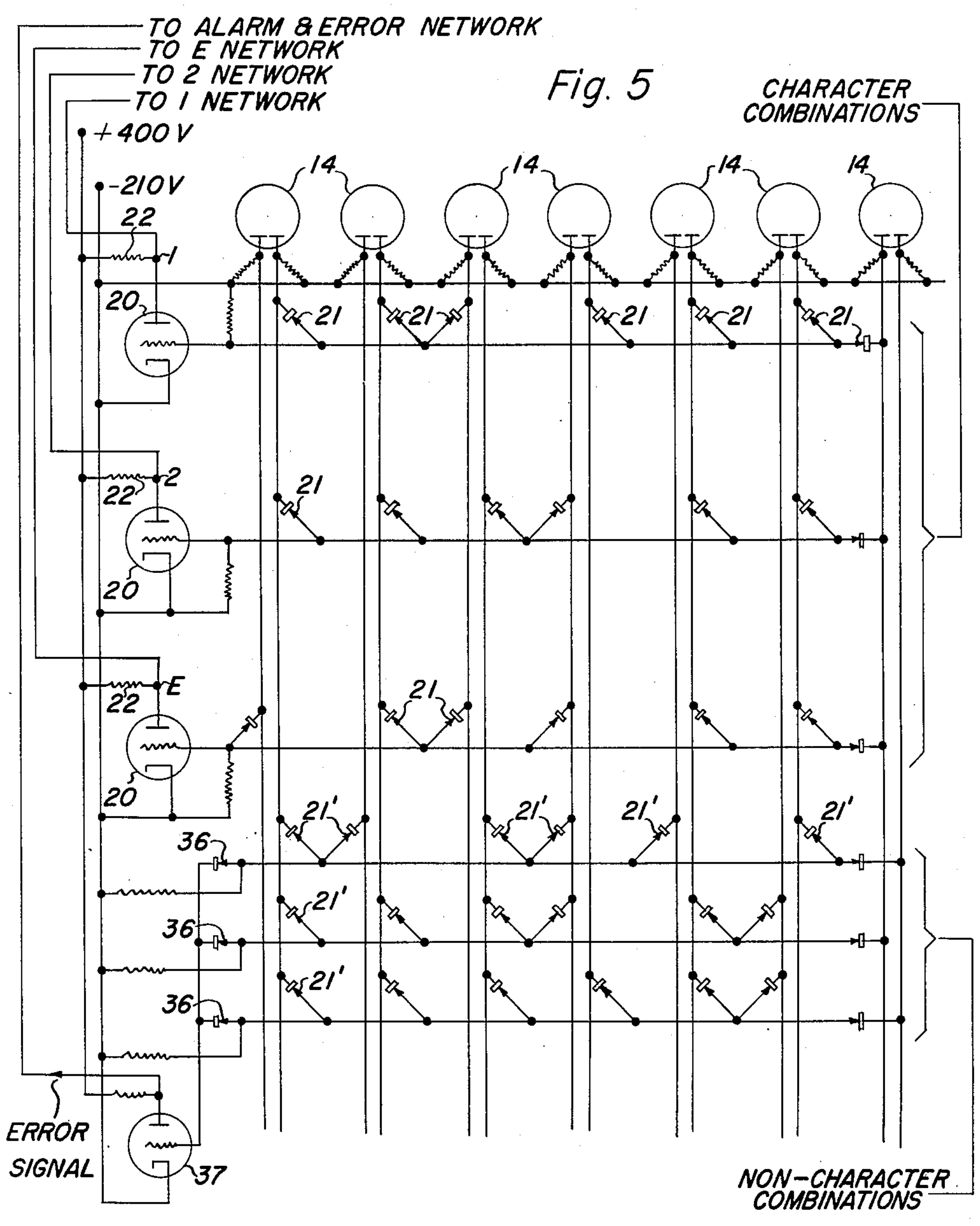
Fig. 5 illustrates a modified form of error detecting unit.

Another possible arrangement for indicating an error when using the code of Fig. 4 is illustrated in Fig. 5 in which the flip-flop tubes 14, their associated analyzer circuits and the character tubes 20 are connected as in Fig. 1. With all thirty-six character combinations connected to the flip-flop circuits there are ninety-one other combinations that might occur through error but which will not print since there is no character tube 20 associated with such combinations. Consequently, since all the character combinations have either two or four signals, the missing of one signal through error will result in a combination for which there is no character and none will be printed. By connecting each such non-character combination through diodes 21′ to diodes 36 a tube 37 common to all of the diodes 36 will be energized to provide an error signal whenever a non-character occurs. This error signal may be employed for any desired purpose including the printing of an error indication.

It will be evident that the apparatus of the invention is indifferent to the origin of the character-representing signals as well as to the type of recording mechanism employed, the use of sensing brushes for deriving the signals and of carbon paper recording for printing have been illustrated because of their rather common usage.

The modifications described for the purpose of disclosing the fundamental features of the invention are not to be taken as limiting since many other modifications and adaptations will be obvious to those skilled in the art without departing from the scope of the appended claims.

What I claim as new and desire to secure by Letters Patent of the United States is:

1. An analyzer for character-representing signals coded in a predetermine-numbered groups comprising a plurality of input circuits equal in number to the number of positions used in coding, a flip-flop circuit associated with each of said input circuits normally conducting on one side and adapted to have the current selectively transferred to the other side in accordance with the code of a received signal, a plurality of character-selecting electronic circuits equal in number to the number of characters to be analyzed, each of said circuits being connected by a rectifier to one side or the other of each of said flip-flop circuits and responsive to the current transfer in a predetermine-numbered group of said flop-flop circuits, an electronic error sensing circuit associated with each of said flip-flop circuits and responsive thereto for deriving a voltage proportional to the number of flip-flop circuits undergoing current transfer, and an electronic control circuit associated with said sensing circuit and rendered operable only when such derived voltage is proportional to the number of current transfers in the flip-flop circuit different from the predetermine-numbered group known to the code employed.

2. An analyzer for character-representing signals coded in equal-numbered groups comprising a plurality of input circuits equal in number to the number of positions used in coding, a flip-flop circuit associated with each of said input circuits normally conducting on one side and adapted to have the current selectively transferred to the other side in accordance with the code of a received signal, a plurality of character-selecting electronic circuits equal in number to the number of characters to be analyzed, each of said circuits being connected by a rectifier to one side or the other of each of said flip-flop circuits and responsive to the current transfer in an equal-numbered group of said flip-flop circuits, an electronic error sensing circuit associated with each of said flip-flop circuits and responsive thereto for deriving a voltage proportional to the number of flip-flop circuits undergoing current transfer, and an electronic control circuit associated with said sensing circuit and rendered operable to provide an error signal only when such derived voltage is proportional to the number of current transfers in the flip-flop circuit different from the equal-numbered group known to the code employed.

3. An analyzer for character-representing signals coded in equal-numbered groups of two and four signals comprising a plurality of input circuits equal in number to the number of positions used in coding, a flip-flop circuit including a diode associated with each of said input circuits, each flip-flop circuit having the grid of the normally conducting side connected to one of said input circuits and the other grid connected to the anode of its respective diodes, and adapted to have the current selectively transferred to the other side in accordance with a received signal for posting an electrical pulse on the terminal corresponding to the character of the code combination, a plurality of character selecting electron tubes equal in number to the number of characters to be analyzed, the grid of each tube being connected in circuit with a rectifier to one or the other of the anodes of each of said flip-flop circuits in accordance with the code employed and responsive to said electrical pulse from an equal-numbered group of said flip-flop circuits, a plurality of electron tubes each having the grid thereof connected to one of the anodes of the normally conducting side of said flip-flop circuits and responsive thereto for deriving a voltage proportional to the number of flip-flop circuits undergoing current transfer, an inverter electronic tube and a control electronic tube having the grids thereof connected to the anodes of said plurality of electron tubes and responsive to all non-code combinations of one and of three signals for providing a control potential, and means responsive to said control potential for indicating that a non-code combination of signals has been received.

4. In a coded signal analyzer system in which the character represented by a received signal is identified by a circuit network including a plurality of flip-flop circuits normally conducting on one side and adapted to have their currents selectively transferred to the other side in accordance with the code of a received signal, a plurality of electron tubes individual to said flip-flop circuits and having their control grids connected to the anodes of the normally conducting sides of the flip-flop circuits, each tube normally being biased to cut-off until its respective flip-flop circuit receives a signal for transferring the current, for deriving a voltage proportional to the number of flip-flop circuits undergoing current transfer, a control circuit including an inverter tube and a control tube having the grid of said inverter tube and one of the grids of said control tube connected to the anodes of said plurality of electron tubes for providing an error signal when such derived voltage is proportional to a number of current transfers in the flip-flop circuits different from the number known to the code employed.

References Cited in the file of this patent

UNITED STATES PATENTS

| Number | Name | Date |
|---|---|---|
| 2,153,737 | Spencer | Apr. 11, 1939 |
| 2,471,126 | Spencer et al. | May 24, 1949 |
| 2,552,629 | Hamming et al. | May 14, 1951 |
| 2,557,964 | Herbst | June 26, 1951 |
| 2,575,017 | Hunt | Nov. 13, 1951 |
| 2,608,615 | Oberman | Aug. 26, 1952 |